Inventor:-
Alexander Havelock Evans.
By his Attorney:- Walter Gunn

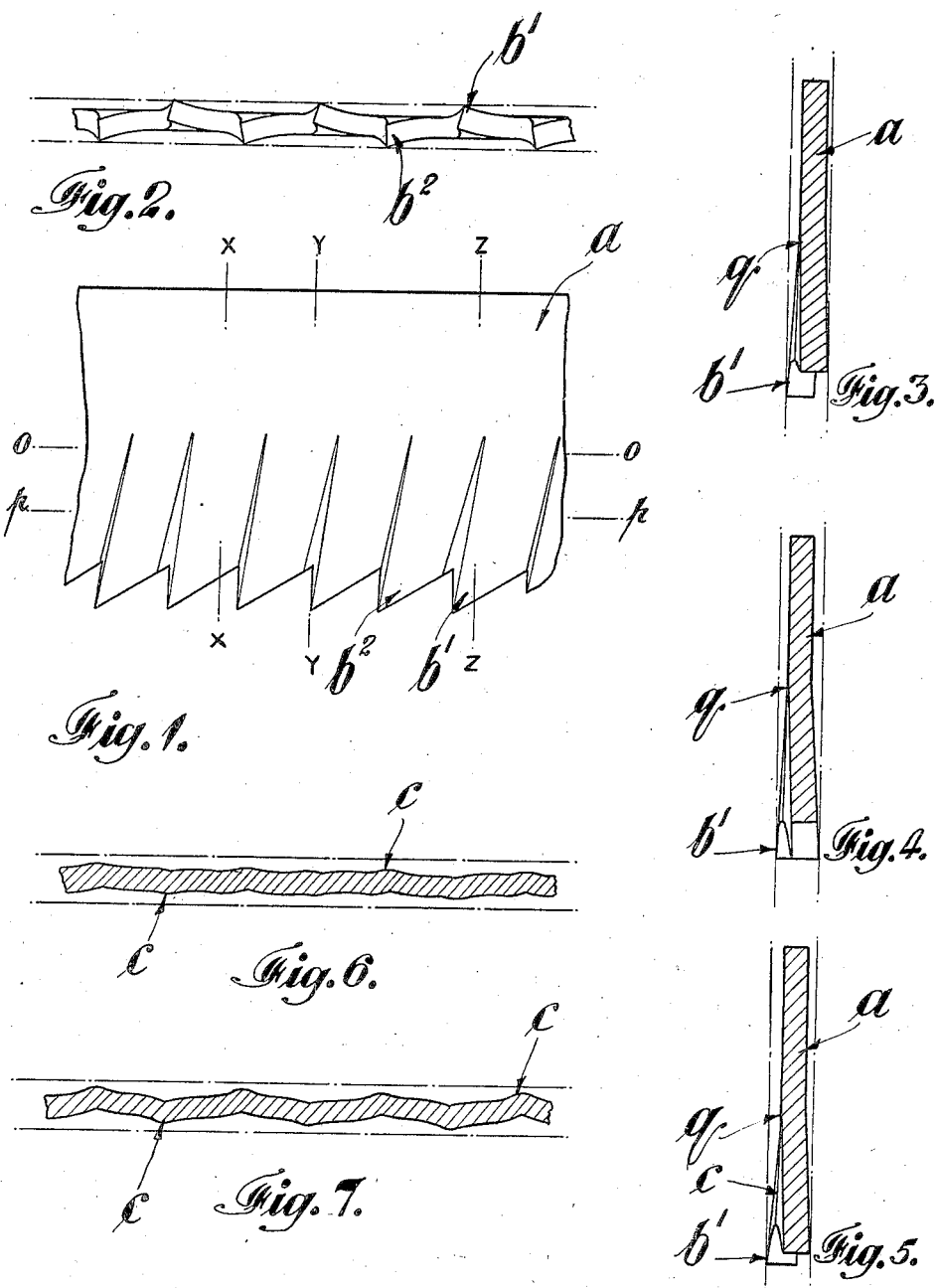

Patented Aug. 7, 1923.

1,463,880

UNITED STATES PATENT OFFICE.

ALEXANDER H. EVANS, OF MANCHESTER, ENGLAND, ASSIGNOR OF ONE-HALF TO EDWARD G. HERBERT LIMITED, OF MANCHESTER, ENGLAND, A COMPANY OF GREAT BRITAIN AND IRELAND.

HACK SAW AND BAND SAW AS USED FOR CUTTING METALS.

Application filed June 1, 1922. Serial No. 565,222.

*To all whom it may concern:*

Be it known that I, ALEXANDER HAVELOCK EVANS, a subject of the King of Great Britain and Ireland, residing at Manchester, England, have invented new and useful Improvements in Hack Saws and Band Saws as Used for Cutting Metals, of which the following is a specification.

This invention refers to hack saws, and band saws, as used for cutting metals. To give clearance in cutting, some or all of the teeth of a hack saw or band saw are angularly bent or deflected out of the plane of the saw blade, such deflection being called the "set" of the teeth. Such "set" has hitherto extended only part way down the tooth, or at most from the point of the tooth to the base of the tooth, i. e: the widest part of the tooth, consequently as the teeth of the saw are ground away by repeated sharpening, the degree of set or clearance diminishes and by the time the original teeth are completely ground away, the teeth formed out of the back portion of the blade, have no set at all, and will not clear themselves.

Owing to the difficulty in resetting the teeth while cold, and owing to the inconvenience and expense of resetting by the usual process, a hack saw after the "set" has disappeared is usually discarded. In the case of band saws they are usually reset.

This invention has for its object so to set the teeth of a hack saw, or band saw, that the saw can be used for a longer period and yield a larger total output than heretofore before requiring to reset or discard the same, or, in other words, the saw will allow of being ground a greater number of times than the known saw before ceasing to cut or clear itself.

According to the invention, the original teeth of the saw requiring to be set are each given an individual "set" similar to the ordinary set, but instead of the set extending only part way down the tooth, or to the base of the tooth, the "set" extends from the point of the tooth to a point well beyond the base of the tooth, that is to say, a portion of the body of the saw, as well as the tooth, is angularly deflected out of the plane of the saw. The extent to which the "set" extends into the body of the saw may vary and will depend on the thickness of the blade, the width of the blade, the pitch of the teeth, and the order in which they are set.

Upon the accompanying drawings:—

Fig. 1 illustrates, to an enlarged scale, a side elevation of a short length of a hack saw or band saw in which the teeth are "set" to right and left of the plane of the saw alternately and according to the invention.

Fig. 2 illustrates, to the same scale, an edge or inverted plan view of the same saw blade.

Figs. 3, 4 and 5 illustrate cross sections of the saw blade shown in Figures 1 and 2 on lines $x$—$x$, $y$—$y$ and $z$—$z$ respectively.

Figs. 6 and 7 illustrate sectional plan views on lines $o$—$o$ and $p$—$p$ respectively.

As shown in Figures 1 to 9, $a$ is the blade or body part of the saw, while $b^1$, $b^2$ are the teeth. The teeth $b^1$ are set to the left and the teeth $b^2$ are set to the right, looking at the blade from the right hand end of Figure 1. According to the invention the "set" of each tooth, instead of extending only a short distance from the point of the tooth towards the body of the saw and not beyond the base or widest part of the tooth, is extended beyond the base of the tooth, and therefore into the body of the saw. In Figures 3, 4 and 5 the "set" is shown as extending from the point or cutting edge of the tooth to the point $q$, which is well below the base of the tooth.

In carrying the "set" into the body of the saw the metal of the saw next the teeth is caused to have other than a flat surface, each deflection producing a slight ridge $c$ on one face and a slight depression on the other face, while the intermediate parts between adjacent ridges are inclined to each other.

Figure 8:
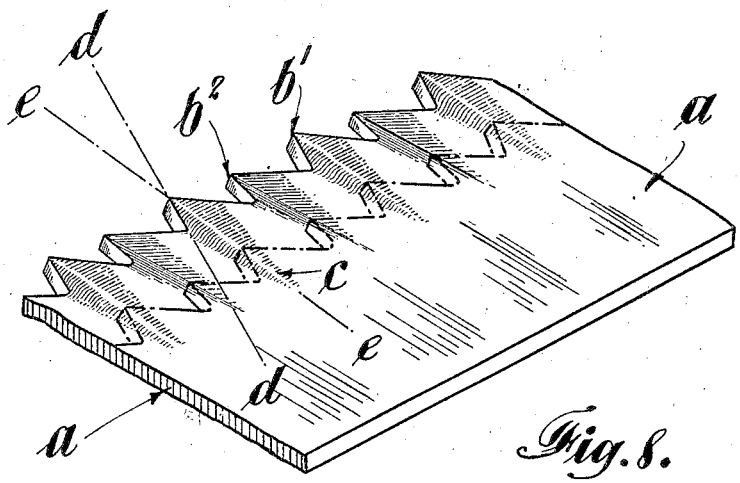
Figs. 8 and 9 illustrate perspective views of the improved saw taken from different points of view.
Figure 9:
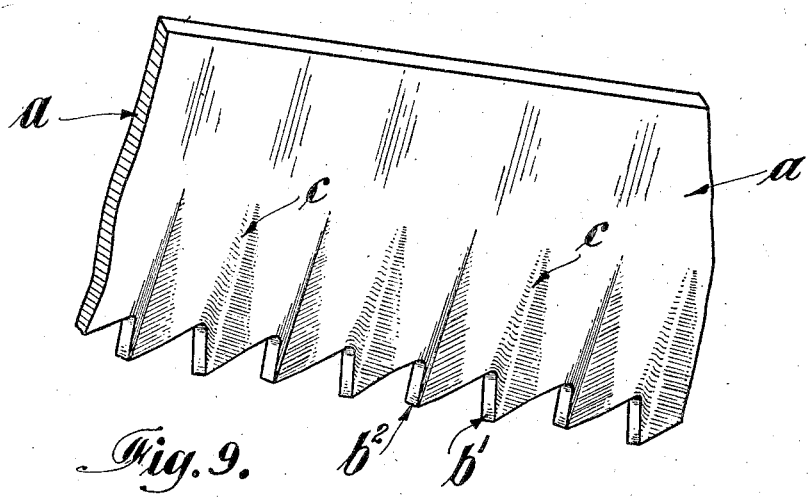

The teeth may be sharpened by grinding on the backs of the teeth only, or on the backs and faces of the teeth. In the former case the ridges $c$ will lie at right angles to the longitudinal axis of the saw, but in the latter case the ridges will lie diagonally to such axis and rearwardly of the cutting faces of the teeth, as shown in Figures 1, 8 and 9. In either case, as the teeth are ground away, the ridges c always extend from the points of the teeth, which are the widest part of the saw. The dotted lines in Figure 8 illustrate this point.

The chain lines d—d, e—e in Figure 8 represent respectively the angle of the cutting face of a tooth, and the angle of the ridge c relatively to the longitudinal axis of the saw blade when the teeth are to be ground upon the back and face.

With alternate teeth set to right and left respectively and the set carried into the body of the saw in the manner and to the extent described, the saw blade will partake of the horizontal section shown in Figure 6 taken along line o—o, and of the horizontal section shown in Figure 7 taken along the line p—p. The teeth $b^1$, $b^2$ on edge will have the appearance shown in Figure 2. On lines x—x, y—y and z—z the saw will be of the vertical section shown in Figures 3, 4 and 5 respectively. In each view (Figures 2 to 7) the parallel chain lines represent the widest part of the saw, i. e.: the width across the teeth.

Figure 10:
Fig. 10 illustrates an edge view of a length of hack saw or band saw blade made according to the invention and in which every third tooth is straight (not set) and the intermediate teeth are set to right and left respectively and according to the invention.

In Figure 10 the invention is shown applied to a hack saw or band saw, the teeth of which are set in the order of "left, right, straight." The invention may also be applied to hack saws or band saws, the teeth of which are set in any other order.

The setting of the teeth in the manner described will usually be effected by means of rollers or dies after cutting the teeth and prior to hardening the blade.

It will now be seen that by enabling the teeth of a hack saw, or band saw, to continue to cut and to clear themselves long after the original teeth are worn or ground away, a larger total output can be obtained with a given blade (or a given output can be obtained at a lower cost in saw blades) and by reason of this extended life the use of high speed steel and the like steels for making saw blades will be made economical, and as is well known the use of high speed steel results in a large rate of output.

What I claim is:—

1. A saw as used for cutting metals and having a straight cutting edge wherein the teeth and the adjacent parts of the body of the saw have an angular clearance "set" consisting of a deflection of the metal forming said teeth and parts out of and at an angle to the normal plane of the saw, the deflection of some of the teeth and adjacent parts being to the right while the deflection of other teeth and adjacent parts is to the left of the plane of the saw blade, and the projecting points of the teeth thus deflected standing out at all times further from the plane of the body of the saw than any other parts, as set forth.

2. A saw as used for cutting metals and having a straight cutting edge wherein some of the teeth are formed without any set and wherein other teeth and the adjacent parts of the body of the saw have an angular clearance "set" consisting of a deflection of the metal forming said teeth and parts out of and at an angle to the normal plane of the saw, the deflection of said teeth and adjacent parts being to the right and left alternately of the plane of the saw blade, and the projecting points of the teeth thus deflected standing out at all time further from the plane of the body of the saw than any other parts, as set forth.

3. A saw as used for cutting metals and having a straight cutting edge wherein the teeth and the adjacent parts of the body of the saw have an angular clearance "set" consisting of a deflection of the metal forming said teeth and parts out of and at an angle to the normal plane of the saw, the said deflection lying diagonally to the longitudinal axis of the blade and extending from the point of the tooth to a point in the body of the saw blade lying to the rear of the cutting edge of the tooth, and the deflection of some of the teeth and adjacent parts being to the right while the deflection of other teeth and adjacent parts is to the left of the plane of the saw blade, as set forth.

4. A saw as used for cutting metals and having a straight cutting edge wherein some of the teeth are formed without any set and wherein other teeth and the adjacent parts of the body of the saw have an angular clearance "set" consisting of a deflection of the metal forming said teeth and parts out of and at an angle to the normal plane of the saw, the said deflection lying diagonally to the longitudinal axis of the blade and extending from the point of the tooth to a point in the body of the saw blade lying to the rear of the cutting edge of the tooth, and the deflection of said teeth and adjacent parts being to the right and left alternately of the plane of the saw blade, as set forth.

5. A saw as used for cutting metals and having a straight cutting edge wherein the saw has a clearance "set" formed by pressing the metal of the saw from the point of a tooth to a point in the body of the saw beyond the base or root of the tooth out of the plane of the saw blade, the projecting point of the teeth lying furthest from the plane of the saw blade and no part of the pressed out metal being parallel to the normal plane of the saw, and the "set" thus formed being similar to the ordinary known set but carried below the root of the tooth and into the body of the blade, as set forth.

6. A saw as used for cutting metals and having a sraight cutting edge, the teeth of which have a "set" produced by deflecting part of the body of the saw in addition to the tooth out of the plane of the saw blade, the deflection or "set" being other than parallel to the plane of the saw and forming with said plane a number of angles at points which lie at and beyond the base of the tooth, and not at the base of the tooth only as in the ordinary known set, as set forth.

7. A saw as used for cutting metals and having a straight cutting edge, the teeth of which have a "set" formed by deflecting the metal of the saw from the point of the tooth to a point in the body of the saw beyond the base of the tooth out of the plane of the saw blade, the projecting point of the tooth lying furthest from the normal plane of the saw and a straight line drawn from the projecting point of the tooth to the point in the body of the saw beyond the base of the tooth lying along the highest part of the deflection and forming an angle with the plane of the saw so that as the saw teeth are reground from time to time the projecting points of the tooth will lie at successive points along the said straight line and will still lie at a greater distance from the normal plane of the blade than any other part of the saw, except the projecting points of similar teeth, as set forth.

8. A saw as used for cutting metals and having a straight cutting edge wherein is a series of depressions lying at an angle to the plane of the saw and each of triangular form in plan, the apex of each of such triangular depressions being a point in the body of the saw, its base being the back edge of a saw tooth, its second side being a line connecting the point of the tooth with the apex of the triangular depression, and the third side being a line in the plane of the saw connecting the rear angle of the said tooth with the apex of the triangular depression, as set forth.

9. A saw as used for cutting metals and having a straight cutting edge wherein the teeth have an angular set relatively to the plane of the saw blade, and also wherein the set is carried into the body of the saw whereby after the original teeth have been ground away the new teeth formed by grinding have a set and will continue to cut, as set forth.

10. The process of setting saws as used for cutting metal and having a straight cutting edge consisting in deflecting the already cut teeth and parts of the body of the of the blade next the teeth, out of the plane of the blade, each deflected tooth and adjacent part lying at an angle to the plane of the blade, and the deflection extending into the body of the saw for a distance which allows of the teeth formed by later grinding having a set after the original teeth have been ground away, as set forth.

In testimony whereof I have signed my name to this specification.

A. H. EVANS.